United States Patent [19]

Hong Le

[11] Patent Number: 4,505,157

[45] Date of Patent: Mar. 19, 1985

[54] TRANSDUCERS WITH QUICK DOME CONNECT SYSTEMS

[75] Inventor: Da Hong Le, Pasadena, Calif.

[73] Assignee: Transamerica DeLaval Inc., Lawrenceville, N.J.

[21] Appl. No.: 520,680

[22] Filed: Aug. 5, 1983

[51] Int. Cl.³ .................... A61B 5/02; G01L 19/00
[52] U.S. Cl. ................................. 73/756; 128/675
[58] Field of Search ............... 73/756, 431; 128/675; 99/343, 342

[56] References Cited

U.S. PATENT DOCUMENTS

| | | | |
|---|---|---|---|
| D. 210,922 | 4/1968 | Tavel | D83/1 |
| 3,166,843 | 1/1965 | Herlache | 92/343 |
| 3,451,391 | 6/1969 | Tavel | 128/36 |
| 3,499,434 | 3/1970 | Ullrich et al. | 128/675 |
| 3,549,920 | 12/1970 | Tavel | 128/36 |
| 3,587,322 | 6/1971 | Lobdell et al. | 73/726 |
| 3,646,495 | 2/1972 | Cowmeadow | 339/14 R |
| 3,888,559 | 6/1975 | Geib | 339/46 |
| 3,901,538 | 8/1975 | Blakely | 285/33 |
| 3,924,881 | 12/1975 | O'Connor | 285/156 |
| 4,072,056 | 2/1978 | Lee | 73/706 |
| 4,108,008 | 8/1978 | Jowett et al. | 73/756 |
| 4,185,641 | 1/1980 | Minio et al. | 128/675 |
| 4,252,126 | 2/1981 | Mandi | 128/675 |
| 4,279,355 | 7/1981 | Schwartz et al. | 220/300 |
| 4,365,635 | 12/1982 | Bowman | 128/675 |

OTHER PUBLICATIONS

Dias et al., "Capacitive Blood Pressure Transducer", ISA Trans., vol. 19, No. 3, 1980, pp. 19–23.

*Primary Examiner*—Donald O. Woodiel
*Attorney, Agent, or Firm*—Benoit Law Corporation

[57] ABSTRACT

Methods and apparatus for interconnecting a transducer body with a fluid-receiving transducer dome provide the transducer body with a radial shoulder, where an annular tightening member, rotatable relative to the transducer body, is also provided. An axial bias between the tightening member and the radial shoulder resiliently restrains the tightening member and the transducer body against movement away from each other. A groove for receiving a fastening member projecting either from the tightening member or the dome is provided at the dome or the tightening member. This groove is delimited with a stepped rigid tongue for retaining the fastening member therein. The dome and the transducer body are biased into fluid-tight engagement with the axial bias acting between the radial shoulder and the annular tightening member and acting on the dome through the projecting fastening member and rigid tongue.

20 Claims, 5 Drawing Figures

TRANSDUCERS WITH QUICK DOME CONNECT SYSTEMS

BACKGROUND OF THE INVENTION

1. Field of the Invention

The subject invention relates to pressure and other transducers, to transducer dome constructions, and to transducer dome quick connect/disconnect systems.

2. Disclosure Statement

The following disclosure statement is made pursuant to the duty of disclosure imposed by law and formulated in 37 CFR 1.56(a). No representation is hereby made that information thus disclosed in fact constitutes prior art, inasmuch as 37 CFR 1.56(a) relies on a materiality concept which depends on uncertain and inevitably subjective elements of substantial likelihood and reasonableness and inasmuch as a growing attitude appears to require citation of material which might lead to a discovery of pertinent material though not necessarily being of itself pertinent. Also, the following comments contain conclusions and observations which have only been drawn or become apparent after conception of the subject invention or which contrast the subject invention or its merits against the background of developments which may be subsequent in time or priority.

U.S. Pat. No. 3,587,322, by S. L. Lobdell et al, issued June 28, 1971, discloses a pressure transducer mounting having an adapter that may act as a fluid-receiving transducer dome. According to that patent, such dome has an internal thread for engaging an external thread on the transducer mounting body. With such an arrangement, one or more lines would be subjected to turning torque, when the transducer dome is threaded onto the transducer mounting body, or is removed therefrom, while one or more fluid lines are connected to the transducer dome and an electrical line or cable is connected to the transducer mounting body. The same comments would appear to be applicable to the threaded transducer dome design of U.S. Pat. No. 4,252,126, by J. P. Mandl, issued Feb. 24, 1981.

Threaded domes are also apparent from U.S. Pat. No. 3,499,434, by G. Ullrich et al, issued Mar. 10, 1970 and disclosing a sound and pressure diagnostic apparatus having several lines connected thereto, and U.S. Pat. No. 4,072,056, by A. St. Jacques Lee, issued Feb. 7, 1978, for a fluid containment structure for transducer systems.

In general, such systems tended to impose turning torques on attached fluid lines and electrical cables, failed to provide a constant and uniform sealing pressure on the transducer diaphragm, were prone to overtightening, and did not enable any quick connect and disconnect operation of the dome relative to the transducer body.

U.S. Pat. No. 4,185,641, by T. G. Minior et al, issued Jan. 29, 1980, discloses a spring loading system, with resilient tongues that engage corresponding projections in such a manner as to draw the dome and transducer together when one is rotated with respect to the other. Detent notches for the projection are said to insure that the force between the dome and the transducer is always the same. Reference may in this respect also be had to the related article by J. F. Dias et al, entitled *Capacitive Blood Pressure Transducer*, ISA Transactions, Vol. 19, No. 3, pp. 19 to 23.

For a disclosure of twist-lock containers, reference may be had to U.S. Pat. No. 4,279,355, by E. L. Schwartz et al, issued July 21, 1981. With such twist-lock containers, as well as with the pressure dome connecting system disclosed as mentioned above by Minior et al and Dias et al, it is, of course, still necessary to twist the dome and transducer body relative to each other during attachment and detachment which, depending on the application, may in practice shift the fluid and electrical lines.

A few years ago, a cordless vibrating massager was developed with a removable cap for the battery casing at the rear thereof, as may be seen from the U.S. Pat. No. Des. 210,922, issued Apr. 30, 1968, and U.S. Pat. Nos. 3,451,391, issued June 24, 1969, and 3,549,920, issued Dec. 22, 1970, and all naming J. H. Tavel as inventor. As apparent from the latter patents, the inside of the sidewall of the end cap was provided with a pair of diametrically spaced bosses which protrude inwardly a short distance. The outside of the lower end of the battery housing was provided with a pair of substantially L-shaped slots, which have a short axial leg connecting with a substantially longer transverse leg.

The bosses were dimensioned and adapted to slidably move into the open lower end of the short axial legs of the slots and then moved from the upper end of the axial leg into the transverse leg. The lower edge of each of the transverse legs of the slots was angled slightly downwardly from its closed end towards its junction with the axial leg. A short stop was disposed at one end of the lower edge of each of the transverse legs, directly adjacent to the intersection of the transverse leg with the axial leg. The stop acted to engage the boss in its counterclockwise movement along the axial leg. The boss could be moved past the stop only by moving the end cap inwardly against the pressure of the contact spring of a battery terminal. The stop accordingly was supposed to prevent accidental removal of the end cap and batteries and to permit such removal only when the end cap was moved inwardly and then rotated past the stop. In cordless electric vibrators actually built and marketed under these patents, the lower edge of each of the transverse legs of the transverse slots has no longer been angled downwardly, but rather extends in a plane perpendicular to a longitudinal axis of the elongate battery housing or vibrator.

As another example of an area which had to deal with the task of providing quick connect and disconnect of interrelated parts, the connector field may be referred to. For instance, U.S. Pat. No. 3,646,495, by R. R. Cowmeadow, issued Feb. 29, 1972, shows a connector device having a detent lock with a leaf detent spring disposed between facing annular surfaces of a pair of rings and engageable in a key slot in one of the rings to lock them against relative rotation.

Another example is seen from U.S. Pat. No. 3,888,559, by R. L. Geib, issued June 10, 1975, and showing a quick disconnect connector assembly including a plurality of ball bearing locking members in the plug portion of the connector, cooperating with a groove in a corresponding receptacle portion for locking these two components together. The position of the ball bearing locking members was controlled by a spring biased locking spring. Pulling the locking ring against the force of its biasing spring released the ball bearing locking members for quick separation of the two connector portions.

Another quick connect coupling is apparent from U.S. Pat. No. 3,901,538, by S. W. Blakely, issued Aug.

26, 1975, and disclosing a threaded male coupling member in which a female coupling member is provided of such design that the male member may be inserted and locked without moving or rotating the female member. An inwardly sprung, resilient snap spring is situated within a tubular shell member and is provided with internal threads for engaging and blocking the male member in position. The shell is contoured to hold the snap spring in locking engagement with the male member in the event that force is applied to the coupling to pull it apart.

Another connector, manufactured by the Cannon Division of ITT under the desigantion 7841 MS 3122E 14-5P for the female member and 7729, MS 3116F14-5S for the male member, has three circumferentially distributed pins projecting from a cylindrical outer wall of the female member and engaging three slanted slots in an annular tightening member encompassing and being retained at the male member and being rotatable relative thereto.

At the end of each of these slanted slots, there is a radial bore for receiving one of the projecting pins of the female member; the arrangement being such that the projecting pins of the female member click into the corresponding radial bores of the tightening member at the end of a rotation thereof.

Reference may also be had to quick connect pipe couplings and fittings. For instance, U.S. Pat. No. 3,924,881, by J. V. O'Connor, issued Dec. 9, 1975, shows a pipe fitting in which a female member includes shoulder portions cooperating with corresponding elements of an annular gasket retaining element.

Despite this wealth of proposals and designs, the need for an improved transducer body and dome interconnecting system has persisted.

SUMMARY OF THE INVENTION

It is a general object of this invention to overcome the disadvantages and meet the needs expressed and implicit in the above disclosure statement and in other parts hereof;

It is a germane object of this invention to provide an improved system for interconnecting a transducer body with a transducer dome.

It is a related object of this invention to provide for constant and uniform sealing pressure on a transducer diaphragm or between a transducer dome and transducer body.

It is also a related object of this invention to provide a transducer body and dome interconnection that cannot be overtightened.

It is also a related object of this invention to avoid imposition of a turning torque on fluid lines, electrical leads and parts of a transducer body and dome assembly, when these parts are connected and disconnected.

It is a germane object of this invention to provide improved quick connect and disconnect coupling systems for selectively attachable and removable transducer domes.

Other objects of the invention will become apparent in the further course of this disclosure.

From a first aspect thereof, the subject invention resides in methods and apparatus for interconnecting a transducer body with a fluid-receiving transducer dome, comprising, in combination, the steps of, or means for, providing the transducer body with a radial shoulder, providing around the transducer body at the radial shoulder an annular tightening member, rendering the tightening member rotatable relative to the transducer body, providing between the tightening member and the radial shoulder an axial bias resiliently restraining the tightening member and the transducer body against movement away from each other, providing in one of the tightening member and the dome a groove for receiving a fastening member projecting from the other of the tightening member and the dome, delimiting the groove with a stepped rigid tongue for retaining the fastening member in the groove, and biasing the dome and the transducer body into fluid-tight engagement with the axial bias acting between the radial shoulder and the annular tightening member and acting on the dome through the projecting fastening member and rigid tongue.

From another aspect thereof, the subject invention resides in methods and apparatus for interconnecting a transducer body, having a longitudinal axis, with a fluid-receiving transducer dome, and, more specifically, resides in the improvement for enabling the transducer body and the dome to move angularly relative to each other, together with any lines attached thereto, while preserving an interconnection of the body and dome intact, comprising in combination, the steps of, or means for, providing the transducer body with a radial shoulder, providing around the transducer body at the radial shoulder an annular tightening member, rendering the tightening member rotatable relative to the transducer body, providing between the tightening member and the radial shoulder an axial bias resiliently restraining the tightening member and the transducer body against movement away from each other, providing in one of the tightening member and the dome a groove for receiving a fastening member projecting from the other of the tightening member and the dome, delimiting the groove with a rigid tongue having first and second shoulders for retaining the fastening member in the groove therebetween, providing the rigid tongue with a land extending between the shoulders and lying in a plane extending at right angles to the longitudinal axis, providing the fastening member with a predetermined width parallel to said plane, rendering the fluid-receiving dome and the transducer body angularly movable with respect to each other while the fastening member is retained in the tongue, by making the land along said plane at least twice as long between the shoulders as the predetermined width of the fastening member, and biasing the dome and the transducer body into fluid-tight engagement with the axial bias acting between the radial shoulder and the annular tightening member and acting on the dome through the projecting fastening member, the land and the rigid tongue.

Other aspects of the invention will become apparent in the further course of this disclosure, and no limitation whatever is intended by this summary of the invention in any respect.

BRIEF DESCRIPTION OF THE DRAWINGS

The subject invention and its various aspects and objects will become more readily apparent from the following detailed description of preferred embodiments thereof, illustrated by way of example in the accompanying drawings, in which like reference numerals designate like or functionally equivalent parts, and in which.

Figure 5:
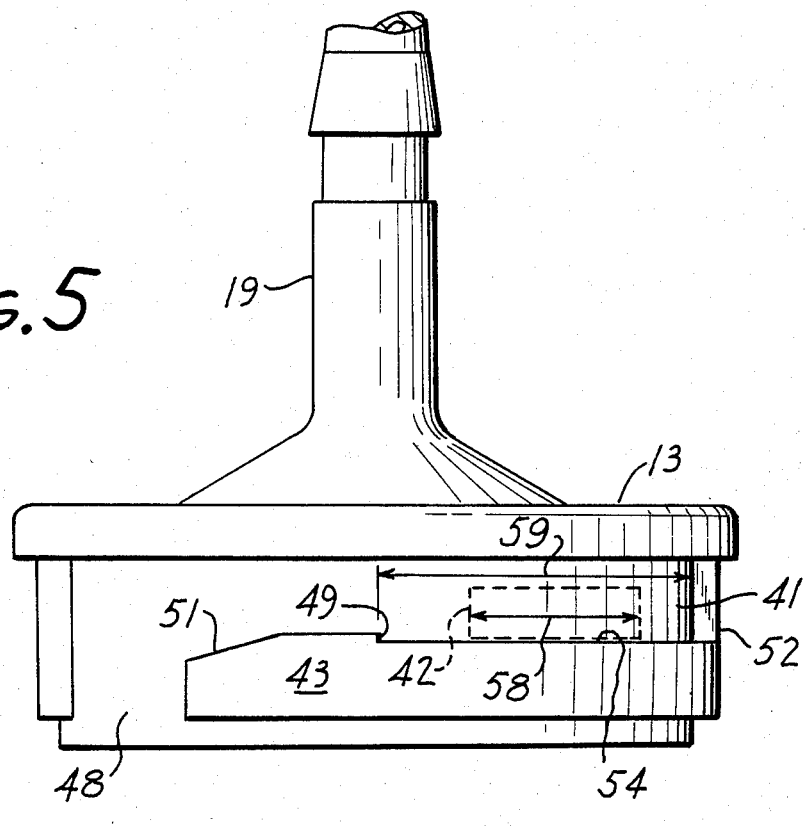
FIG. 5 is a side view similar to FIG. 4, but taken from the line 5—5 in FIG. 2.

The showing of conduit 18 has ben omitted from FIG. 5 to avoid crowding.

DESCRIPTION OF PREFERRED EMBODIMENTS

The fluid pressure transducer 10 shown in the drawings has a transducer body 12 and a removable dome 13 associated therewith. By way of example, the dome 13 may be of a transparent plastic or other conventional transparent material. The transducer body 12 houses a pressure transducer in an upper portion 14 and such pressure transducer presents a diaphragm 15 to the fluid chamber 16 of the dome 13. If desired, the transducer or diaphragm 15 may be separated from the dome chamber 16 by a disposable or other membrane (not shown) in accordance with conventional practice.

The dome 13 has a first tube 18 and a second tube 19. By way of example, the tube 18 may be connected to a source of fluid via a symbolically illustrated fluid line 21, and the tube 19 may be connected to a source of fluid pressure variations or pulses via a symbolically illustrated second fluid line 22. By way of example, the line 22 may be part of a conventional catheter connectable to the circulatory system of a living organism, while the line 21 may be connected to a source of a compatible solution as, for instance, conventional in blood pressure monitoring and other hemodynamic pressure sensing systems. The usual Linden, Luer or other fittings may be employed for releasably attaching the fluid lines 21 and 22 to the dome inlets and outlets 18 and 19. Conventional shutoff valves (not shown) may also be provided in or at the fluid lines 21 and 22.

The transducer in the body 12 or part 14 is connected by an electric cable 25 to electric measuring, monitoring and other typically conventional circuitry or apparatus (not shown) for measuring, monitoring or evaluating the fluid variations, fluctuations or pulses sensed by the transducer via diaphragm 15 at the dome chamber 16.

An electrical connector 26, having, for instance, a male plug 27 on an end of the cable 25 and a female receptacle 28 integral with the transducer body 12, may be employed for conducting electrical currents to and from the pressure transducer. A circular nut or threaded annulus 29 may be employed for releasably securing the plug 27 to the receptacle 28.

While there is no objection to such a threaded interconnection 31 at the electric cable 25, similar threaded connections between the transducer body 12 and dome 13 are proving increasingly disadvantageous and inconvenient in practice.

Disadvantages and inconveniences encountered with threaded dome and transducer body interconnections include lack of a constant and uniform sealing pressure at the transducer diaphragm 15, danger of and detriment from overtightening of the threaded interconnection, imposition of a turning torque on at least the dome and the fluid lines connected thereto during tightening and release of the threaded interconnection, and the slowness imposed by threaded interconnection in the dome attachment and removal process.

These disadvantages and detriments are overcome by the systems and methods for interconnecting a transducer body with a fluid-receiving transducer dome, a preferred embodiment of which is shown at 33 in the accompanying drawings.

In this respect, the transducer body 12 has or is provided with a radial shoulder 34 which, in the illustrated preferred embodiment, extends circumferentially about the transducer body. An annular tightening member or annulus 36 is provided around the transducer body 12 at the radial or circumferential shoulder 34. This tightening member 36 is or is rendered rotatable relative to the transducer body 12. An axial bias 37 is provided between the tightening member and the radial shoulder 34 for restraining such tightening member 36 and the transducer body 12 against axial movement away from each other.

A spring 38, such as a Belleville or other annular spring, may be provided between the annular tightening member 36 and the radial shoulder 34 to provide the axial bias 37.

According to the illustrated preferred embodiment, the annular tightening member 36 is provided with the spring 38 as a bias spring extension engaging the radial shoulder 34 to provide the axial bias 37. This spring extension may be annular, like the circumferential shoulder 34. The annular spring extension 38 of the tightening member 36 thus preferably engages the circumferentially provided shoulder 34 circumferentially to provide the axial bias 37.

The annular spring 38 may be embedded or attached to the tightening member 36 as a resilient extension thereof or, alternatively, may be formed in one piece with the annular tightening member as desired.

A groove 41 is provided in or at a side of the dome 13 for receiving a fastening member 42. In principle, the groove 41 could be provided in the annular tightening member 36, while the fastening member 42 would then project from the side of the dome 13. However, in the illustrated preferred embodiment of the invention, the annular groove 41 is provided in the dome 13, while the fastening member 42 projects inwardly from the tightening member 36. In more general terms, one of the tightening member 36 and the dome 13 is provided with a groove 41 for receiving the fastening member 42 projecting from the other of the tightening member 36 and dome 13.

In either case, the groove 41 is delimited by or with a stepped tongue 43 for releasably retaining the fastening member 42 in the groove 41.

Unlike, for instance, the tongues in the pressure dome of the above mentioned U.S. Pat. No. 4,185,641, the tongue 43 is rigid to provide a most precise and stable locking or abutment surface for the fastening member 42, and to avoid any possibility of any operator jamming the fastening member into a side of any flexible or resilient tongue.

Also, rather than biasing the dome onto the transducer body with any resilient tongue, the illustrated preferred embodiment of the subject invention biases the dome 13 and the transducer body 12 into fluid-tight engagement with the axial bias 37 or annular spring extension 38 acting between the radial shoulder 34 and the annular tightening member 36 and acting on the dome 13 through the projecting fastening member 42 and rigid tongue 43, either in that order, as shown in the drawings or in a reverse order, if the groove 41 and tongue 43 are provided in the annular tightening member 36, while the fastening member 42 projects from a side of the dome 13.

An annular or circular gasket 45 may be provided in and project from a corresponding slot 46 in the dome 13, so as to enhance the fluid-tight engagement of the dome with the transducer body at the diaphragm 15 and fluid chamber 16.

According to an embodiment of the invention, a further groove 141 is provided in one of the tightening member 36 and the dome 13 for receiving a further fastening member 142 projecting from the other of that tightening member 36 and dome 13. The further groove 141 is delimited by or with a stepped rigid further tongue 143 for releasably retaining the further fastening member 142 in such further groove. The transducer dome 13 and transducer body 12 are biased into fluid-tight engagement with the axial bias 37 also via the further fastening member 142 and further tongue 143.

In terms of the illustrated embodiment of the subject invention, the transducer dome 13 is provided with a pair of lateral grooves 41 and 141 for receiving a pair of fastening members 42 and 142, respectively, projecting inwardly from diametrically opposed regions of the annular tightening member 36.

The grooves 41 and 141 are delimited with stepped rigid tongues 43 and 143, respectively, for retaining the fastening members 42 and 142 in the grooves 41 and 141.

Figure 1:
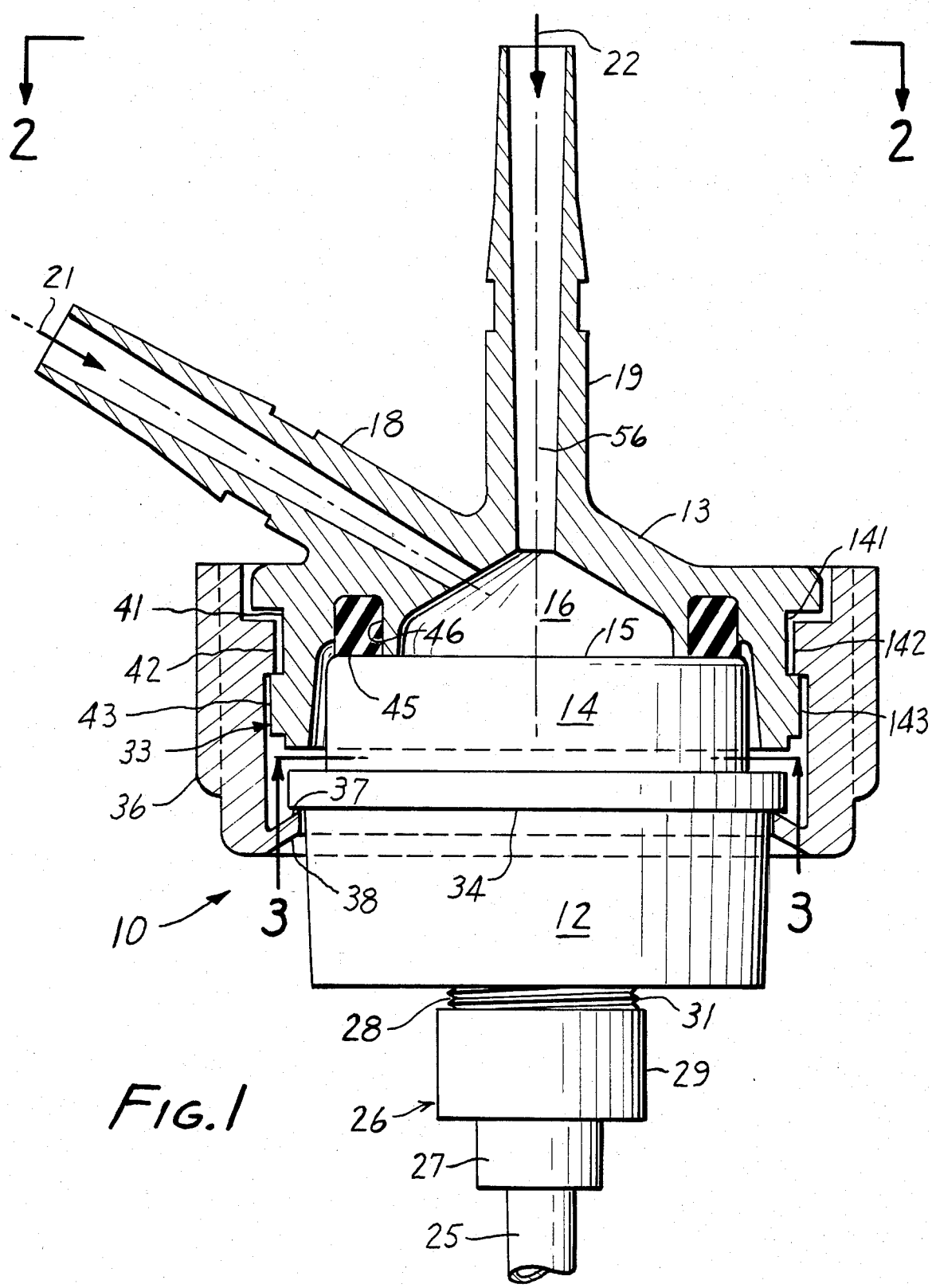
FIG. 1 is an elevation, partially in section, of a fluid pressure transducer according to a preferred embodiment of the subject invention.
Figure 2:
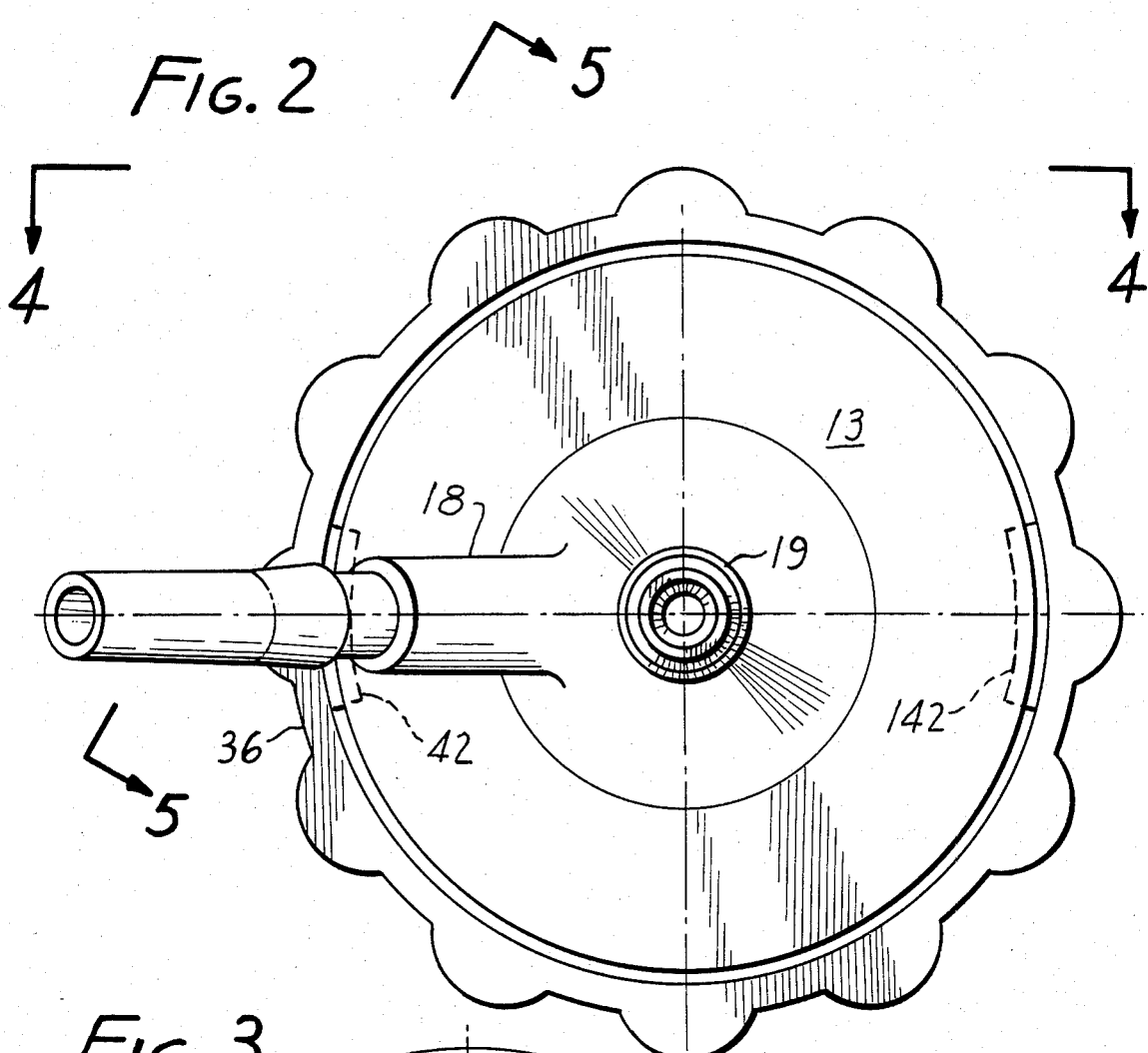
FIG. 2 is a top view taken on the line 2—2 of the transducer of FIG. 1.
Figure 3:
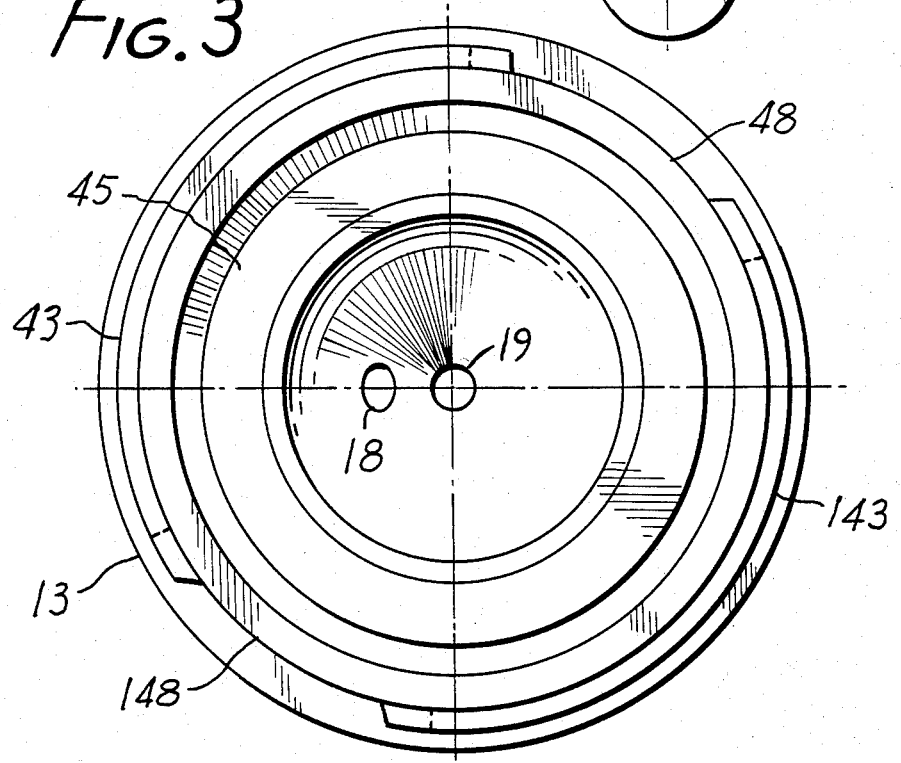
FIG. 3 is a section taken on the line 3—3 of FIG. 1.
Figure 4:
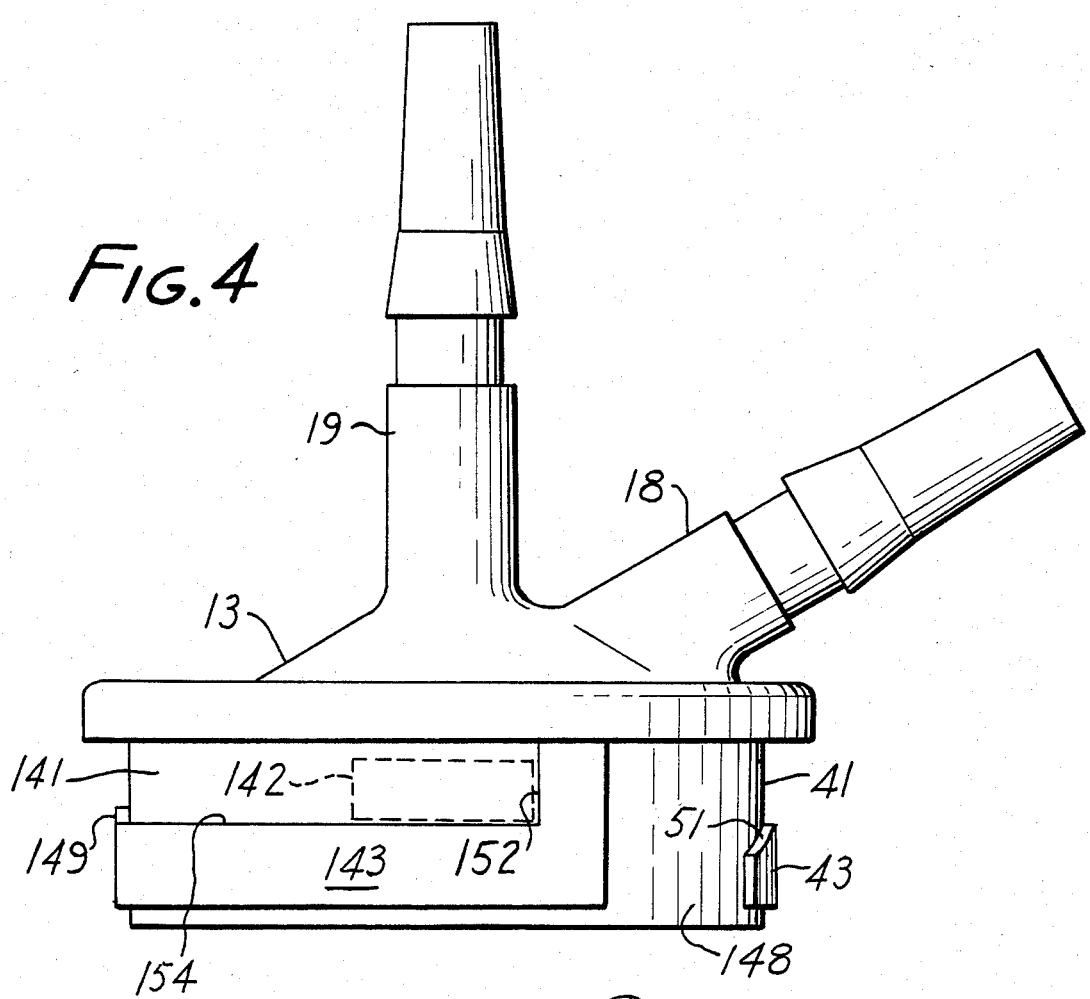
FIG. 4 is a side view of the transducer dome only, as seen from the line 4—4 in FIG. 2.

As best seen from the bottom view of FIG. 3 of the dome 13, that illustrated dome also has diametrically opposed axial lateral slots 48 and 148 for receiving the fastening members 42 and 142 projecting inwardly from the tightening annulus 36. The axial slots or grooves 48 and 148 communicate, respectively, with the radial or peripheral grooves 41 and 141, so that the tightening projections 42 and 142, after insertion through the slots 48 and 148, may readily be positioned past shoulders 49 and 149 into the grooves 41 and 141 for engagement by the tongues 43 and 143 under the power of the axial bias 37, upon angular movement of the tightening annulus 36.

A slanted portion 51 at the axial slot 48 ahead of the shoulder 49 facilitates insertion of the fastening member 42 into the groove 41. A similar slanted portion is provided at the beginning of the second tongue 143, though being covered from view in the drawings.

The rigid tongue 43 is provided with first and second shoulders 49 and 52 for retaining the fastening member 42 in the groove 41. The rigid tongue 43 is also provided with a flat edge or land 54 extending between the shoulders 49 and 52 and lying in a plane extending at right angles or perpendicular to a longitudinal axis 56 of or through the dome 13 or transducer body 12. This land 54 receives the fastening member 42 under the influence of the axial bias 37.

In the illustrated embodiment of the invention, the further or second rigid tongue 143 is also provided with first and second shoulders 149 and 152 for retaining the fastening member 142 in the groove 141. The rigid tongue 143 is provided with a second land 154 extending between the shoulders 149 and 152 and lying also in the plane extending perpendicularly to the longitudinal axis 56 for receiving the second fastening member 142.

The flat perpendicular lands 54 and 154 assure a constant and uniform sealing pressure at the transducer diaphragm 15.

Where the fastening member 42 is provided with a predetermined width 58 parallel to the plane of the land 54, the fluid-receiving dome 13 and the transducer body 12 are rendered angularly movable with respect to each other while the fastening member 42 is retained at the tongue 43, by making the land 54 along the mentioned plane at least twice as long between the shoulders 49 and 52 as the predetermined width 58 of the fastening member. In other words, the distance 59 between the shoulders 49 and 52 is at least twice the width 58 of the fastening member 42. The second fastening member 142 and tongue 154 may be provided with corresponding dimensions.

By way of background, it may be seen from the pressure dome arrangement disclosed in the above mentioned U.S. Pat. No. 4,185,641 that relative movement of the fluid lines and electrical cable in that arrangement may result in an unintended release of the dome from the transducer body.

In the illustrated preferred embodiment of the invention, this is avoided by making the lands 54 and 154 flat for a distance longer than the width of each of the fastening members or tabs 42 and 142. Accordingly, a principle which has been employed in the above mentioned cordless vibrating massager to provide an on/off electrical switch action at a battery casing cap, has through the illustrated preferred embodiment of the subject invention become a means or system for permitting angular movement between fluid dome and transducer body and the respective lines and conduits connected thereto, without in any manner impairing or affecting the fluid-tight seal necessary for perfect operation of the pressure transducer. Accordingly, in the case of a blood pressure sensing or monitoring transducer, the illustrated preferred embodiment of the invention provides for a considerable tolerance in patient and equipment movement without impairment of the monitoring or sensing function. The same applies, of course, to other areas of utility of the pressure transducer 10 where movement of attached lines is to be tolerated and is not to have any adverse effect on high-precision pressure and other measurements.

The subject extensive disclosure will render apparent or suggest to those skilled in the art various modifications and variations within the spirit and scope of the subject invention and equivalents thereof.

I/We claim:

1. In a method of interconnecting a transducer body with a fluid-receiving transducer dome, the improvement comprising, in combination, the steps of:
   providing said transducer body with a radial shoulder;
   providing around said transducer body at said radial shoulder an annular tightening member;
   rendering said tightening member rotatable relative to said transducer body;
   providing between said tightening member and said radial shoulder an axial bias resiliently restraining said tightening member and said transducer body against movement away from each other;
   providing in one of said tightening member and said dome a groove for receiving a fastening member projecting from the other of said tightening member and said dome;
   delimiting said groove with a stepped rigid tongue for retaining said fastening member in said groove; and
   biasing said dome and said transducer body into fluid-tight engagement with said axial bias acting between said radial shoulder and said annular tightening member and acting on said dome through said projecting fastening member and rigid tongue.

2. A method as claimed in claim 1, including the step of:
providing said radial shoulder circumferentially about said transducer body.

3. A method as claimed in claim 1, including the step of:
arranging an annular spring between said annular tightening member and said radial shoulder to provide said axial bias.

4. A method as claimed in claim 1, including the steps of:
providing said radial shoulder circumferentially about said transducer body; and
arranging an annular spring between said annular tightening member and said circumferentially provided shoulder to provide said axial bias.

5. A method as claimed in claim 1, including the step of:
providing said annular tightening member with a bias spring extension engaging said radial shoulder to provide said axial bias.

6. A method as claimed in claim 1, including the step of:
providing said annular tightening member with an annular spring extension engaging said radial shoulder to provide said axial bias.

7. A method as claimed in claim 1, including the steps of:
providing said radial shoulder circumferentially about said transducer body; and providing said annular tightening member with an annular spring extension engaging said circumferentially provided shoulder to provide said axial bias.

8. A method as claimed in claim 1, including the steps of:
providing in one of said tightening member and said dome a further groove for receiving a further fastening member projecting from the other of said tightening member and said dome;
delimiting said further groove with a stepped rigid further tongue for retaining said further fastening member in said further groove; and
biasing said dome and said transducer body into fluid-tight engagement with said axial bias also via said further fastening member and said further tongue.

9. A method as claimed in claim 1, including the steps of:
providing said rigid tongue with first and second shoulders for retaining said fastening member in said groove; and
providing said rigid tongue with a land extending between said shoulders and lying in a plane extending at right angles to a longitudinal axis of said dome for receiving said fastening member.

10. In a method of interconnecting a transducer body, having a longitudinal axis, with a fluid-receiving transducer dome,
the improvement for enabling said transducer body and said dome to move angularly relative to each other, together with any lines attached thereto, while preserving an interconnection of said body and dome intact, comprising in combination, the steps of:
providing said transducer body with a radial shoulder;
providing around said transducer body at said radial shoulder an annular tightening member;
rendering said tightening member rotatable relative to said transducer body;
providing between said tightening member and said radial shoulder an axial bias resiliently restraining said tightening member and said transducer body against movement away from each other;
providing in one of said tightening member and said dome a groove for receiving a fastening member projecting from the other of said tightening member and said dome;
delimiting said groove with a rigid tongue having first and second shoulders for retaining said fastening member in said groove therebetween;
providing said rigid tongue with a land extending between said shoulders and lying in a plane extending at right angles to said longitudinal axis;
providing said fastening member with a predetermined width parallel to said plane;
rendering said fluid-receiving dome and said transducer body angularly movable with respect to each other while said fastening member is retained at said tongue, by making said land along said plane at least twice as long between said shoulders as said predetermined width of the fastening member; and
biasing said dome and said transducer body into fluid-tight engagement with said axial bias acting between said radial shoulder and said annular tightening member and acting on said dome through said projecting fastening member, said land and said rigid tongue.

11. A system for interconnecting a transducer body with a fluid-receiving transducer dome, comprising, in combination:
a radial shoulder on said transducer body;
an annular tightening member around said transducer body at said radial shoulder and rotatable relative to said transducer body;
a groove in one of said tightening member and said dome for receiving a fastening member projecting from the other of said tightening member and said dome;
a stepped rigid tongue delimiting said groove for retaining said fastening member in said groove; and
means for providing between said tightening member and said radial shoulder an axial bias resiliently restraining said tightening member and said transducer body against movement away from each other and for biasing said dome and said transducer body into fluid-tight engagement with said axial bias acting between said radial shoulder and said annular tightening member and acting on said dome through said projecting fastening member and rigid tongue.

12. A system as claimed in claim 11, wherein:
said radial shoulder extends circumferentially about said transducer body.

13. A system as claimed in claim 11, wherein:
said means for providing an axial bias include an annular spring between said annular tightening member and said radial shoulder.

14. A system as claimed in claim 11, wherein:
said radial shoulder extends circumferentially about said transducer body; and
said means for providing an axial bias include an annular spring between said tightening member and said circumferentially provided shoulder.

15. A system as claimed in claim 11, wherein:

said means for providing an axial bias include a bias spring extension said annular tightening member engaging said radial shoulder.

16. A system as claimed in claim 11, wherein:

said means for providing an axial bias include an annular spring extension of said annular tightening member engaging said radial shoulder.

17. A system as claimed in claim 11, wherein:

said radial shoulder extends circumferentially about said transducer body; and said means for providing an axial bias include an annular spring extension of said annular tightening member engaging said circumferentially provided shoulder.

18. A system as claimed in claim 11, including:

a further groove in one of said tightening member and said dome for receiving a further fastening member projecting from the other of said tightening member and said dome; and a stepped rigid further tongue delimiting said further groove for retaining said further fastening member in said further groove; with said means for porviding an axial bias including means for biasing said dome and said transducer body into fluid-tight engagement also via said further fastening member and said further tongue.

19. A system as claimed in claim 11, including:

first and second shoulders on said rigid tongue for retaining said fastening member in said groove; and a land extending on said rigid tongue between said shoulders and lying in a plane extending at right angles to a longitudinal axis of said dome for receiving said fastening member.

20. A system as claimed in claim 11, including:

means for rendering said fluid-receiving dome and said transducer body angularly movable with respect to each other while said fastening member is retained at said tongue, including first and second shoulders on said rigid tongue for retaining said fastening member in said groove therebetween, and a land on said rigid tongue lying in a plane extending at right angles to a longitudinal axis of said dome and extending between said shoulders for distance at least twice as long as a width of the fastening member parallel to said plane;

said fastening member abutting said land and being slidable therealong between said first and second shoulders.

* * * * *